United States Patent [19]

Gibson

[11] Patent Number: 4,876,642

[45] Date of Patent: Oct. 24, 1989

[54] RULES AND APPARATUS FOR A LOOP CAPTURING CODE BUFFER THAT PREFETCHES INSTRUCTIONS

[76] Inventor: Glenn A. Gibson, 4824 Ballerina, El Paso, Tex. 79922

[21] Appl. No.: 144,948

[22] Filed: Jan. 19, 1988

[51] Int. Cl.$^4$ .............................................. G06F 9/38
[52] U.S. Cl. ...................... 364/200; 364/239; 364/239.6; 364/252; 364/259.9; 364/263.1
[58] Field of Search ........................ 364/200, 300, 900

[56] References Cited

U.S. PATENT DOCUMENTS 4,590,551  5/1986  Mathews ............................ 364/200
4,594,659  6/1986  Guenthner et al. .................. 364/200

OTHER PUBLICATIONS

"Simple Algorithm for Locking Short Loops in an Instruction Buffer" by T. K. M. Agerwala, IBM Technical Disclosure Bulletin, vol. 25, No. 1, Jun. 1982, pp. 56–58.

Primary Examiner—Raulfe B. Zache
Attorney, Agent, or Firm—James R. Young

[57] ABSTRACT

Method and apparatus for prefetching and buffering instructions between a code store and a processing element's decode logic. The apparatus is a code buffer that consists of a code RAM and its supporting logic that implements rules for bringing instructions into the code RAM from the code store and outputting them to the decode logic. These rules determine when writing to the code RAM is blocked and reading from the code RAM is blocked by using the write and read addresses and loop information stored in the supporting logic. The rules guarantee that the instructions to be executed are not overwritten, instructions being executed have, in fact, been brought into the code RAM, and loops are kept in the code RAM until they have been exited. The code buffer handles two types of branch instructions, inside branches to instructions that are within the code RAM and outside branches to instructions in the code store. Outside branches cause the branch address and status information to be sent to the code store and the code RAM and its surrounding logic to be reset. The purpose of the code buffer is to reduce the amount of time the decode logic spends waiting for instructions by providing buffering and taking advantage of the reexecution of instructions in loops.

20 Claims, 6 Drawing Sheets

RULES AND APPARATUS FOR A LOOP CAPTURING CODE BUFFER THAT PREFETCHES INSTRUCTIONS

BACKGROUND OF INVENTION

This invention relates to information processing systems, and more particularly to processing elements in such systems. Even more particularly, this invention relates to means for fetching instructions from a code store, such as main memory, into instruction decode logic of the processing element.

Any processing element within a computer must receive its instructions from some form of code store. Ideally, when the processing element is ready to execute the next instruction, that instruction would always be immediately available to its instruction decode logic so that the processing element would never have to wait for the instruction to be fetched. In slower processing systems, the code store is main memory, since the speed of main memory is fast enough to keep up with slower processors. As processor speed increases relative to main memory speed; processors will spend significant waiting time unless some form of high speed code buffer is placed between the processor and main memory.

The problem is further complicated by the requirement of branch instructions in the code, since these make the location of the next instruction unpredictable. Without branch instructions, the code buffer could be a simple first-in, first-out queue. However, because of branch instructions, the queue would need to be flushed and reloaded every time the processor encounters a branch instruction, which would not be very satisfactory. The longer the queue, the more time it would take to reload it. This approach would require only simple algorithms for loading instructions into and taking instructions from the queue; an instruction could be loaded whenever the queue is not full and an instruction could be taken whenever the queue is not empty.

One solution known for this problem is to make the code buffer a high speed random access memory (RAM) which would allow the next instruction to be accessed from any point in the code buffer. Addressing for this type of memory is done with a special memory called a content addressable memory (or sometimes called a translation lookaside buffer) so that the addresses in the high speed RAM appear the same as those in main memory. Only in the case of a branch to an instruction not currently in the RAM would the processing element have to wait for fetches from the main memory. For this approach, the algorithms for loading instructions into and taking instructions from the RAM are very complicated. They have to guarantee that the instructions being brought in do not overwrite instructions already in the buffer and that the instructions being executed are, in fact, the intended instructions.

SUMMARY OF THE INVENTION

It is an object of the present invention to provide a code buffer which will transfer processor instructions from the code store to the decode logic of the processing element of a computer.

Another object of the present invention is to provide a code buffer that retains the instructions of a plurality of instruction loops within the random access memory of the code buffer as long as such loops are being processed or are waiting to be processed.

It is a further object of the present invention to provide a code buffer that continues to fetch instructions from the code store and write them into the code buffer RAM until writing is blocked. Writing is blocked when incrementing the input instruction address causes it to equal the output address (program counter) when no instruction loops are present in the code buffer RAM. Writing is also blocked when one or more instruction loops are present in the code buffer RAM, and the input address becomes equal to the lowest loop begin address.

Yet another object of the present invention is to provide a code buffer that transfers instructions to the decode logic unless transfer is blocked because the program counter is not less than the input address.

Still another object of the present invention in to detect a backward branch instruction being transferred from the code store and store the address of the instruction on a loop end stack and store the branch-to address in the instruction on a loop begin stack. Having just detected an instruction loop, the code buffer sets a loop present state indicator to prevent transfer of instructions into the code buffer RAM beyond the loop begin address. The code buffer also detects an outer loop which contains one or more inner loops and removes the loop begin and loop end addresses of all the inner loops from their respective stacks.

A further object is to detect when the program counter has passed a loop end address and delete the loop end and corresponding loop begin addresses from their stacks. Furthermore, the code buffer detects if all loop begin and loop end addresses have been removed and, if they have, resets the loop present state indicator.

Yet another object is to provide for the special case in which the loop begin and loop end stacks are reduced to one element each (i.e. they are reduced to registers).

The above and other objects are accomplished with a code buffer, containing a random access memory or RAM, that is logically connected between a processing element and a memory element. The memory element is called a code store. The code buffer accesses the RAM as a circular memory to perfect instructions from the code store in order to make instructions immediately available to the processing element decode logic a high precentage of the time. When writing into the code buffers RAM is not blocked the code buffer can request another instruction from the core store. Writing is blocked only when the code buffer RAM is full of instructions that may be executed again, or whenever the code buffers logic cannot hold additional loop information and another nest of loops needs to be created. An instruction may be executed again if it is in a loop from which instructions are currently being taken for execution.

An instruction may be requested by the processing element whenever reading from the code buffers RAM is not blocked. Reading is not blocked when the needed information is currently in the buffers code RAM.

A loop is established whenever a backward branch is encountered in the instructions being input from the code store, and a loop is cancelled whenever there is an attempted read of an instruction that is past the backward branch (i.e., past the end of the loop) or there is a rest. This invention defines the rules and apparatus for writing into and reading from the code buffers RAM and for establishing and cancelling loops in such a way that loops are captured and cannot be overwritten until they are cancelled. Writing into and reading from the code buffer RAM are independent processes that may be in progress at the same time.

BRIEF DESCRIPTION OF DRAWINGS

A better understanding of the present invention may be had from the following description of the preferred embodiment when read in the light of the accompanying drawings whose descriptions are.

DESCRIPTION OF PREFERRED EMBODIMENT

The present invention provides an improved method and corresponding apparatus for perfecting instructions from a code store and making them available to a processing element. It consists of a code buffer and the methods for loading instructions into the buffer from the code store and outputting the instructions to the decode logic of the processing element. It assumes normally constructed programs which are made up of sets of instructions, such as subprograms, with each set being ordered (i.e., one instruction is first in the set, another is second, and so on). The sets will be referred to as sequences of instructions. Within a sequence, if $i<j$ then the ith instruction is said to be before the jth instruction and the jth instruction is said to be after the ith instruction.

The memory portion of the code buffer is a RAM consisting of P locations whose addresses are 0 through $P-1$. The locations are considered to be ordered according to their addresses, but the code buffer is considered to be a circular memory in that the location with address 0 is considered to follow the location with address $P-1$ just as address 1 follows address 0 and so on.

A code buffer reset, which may result from an external signal or an outside branch (see below), causes the code buffer to enter its initial state. Following a reset, the location whose address is 0 will receive the first instruction brought into the code buffer from the code store, the location whose address is 1 will receive the second instruction and so on until the location with address $P-1$ is filled. As the next instructions are input they will be put, in order, into the locations with addresses 0, 1, ..., $P-1$. This cycle is continually repeated until another code buffer reset occurs. At any given time all of the instructions in the code buffer are a subsequence, i.e., are from a single sequence, and they are brought into the code buffer in the order of the sequence.

All processor instructions fall into the following classification scheme:

Non-branch
Branch
   Outside
      Unconditional
      Conditional -continued Inside
   Unconditional
      Backward
      Forward
   Conditional
      Backward
      Forward For an outside branch the branch address included in the instruction is the address of a location in the code store. Only an outside branch can cause a change from one instruction sequence to another. An inside branch is to an instruction that is in the code buffer. For an inside branch, relative addressing may be used and the code buffer address of the instruction to be branched to (called the branch-to address) is the sum (module P) of a displacement included in the instruction and one plus the code buffer address of the location where the branch instruction is to be put. Inside branches may be backward or forward. A backward branch is to an instruction that is before the branch instruction in the instruction sequence or is to the branch instruction itself. A forward branch is to an instruction that is after the branch instruction in the instruction sequence.

A backward branch establishes a loop, which is a subsequence of instructions consisting of the branched to instruction, all instructions after the branched to instruction and ahead of the branch instruction, and the branch instruction itself. If $L_1$ and $L_2$ are loops such that $L_2$ is a proper subset of $L_1$, then $L_1$ and $L_2$ are said to be nested. A loop that contains other loops but is not contained in another loop is called the outer loop of a set of nested loops.

At any given time there are three important addresses and associated locations within the code buffer; they are:

Input address (IA)—the address of the location to which an instruction is currently being written or is to be written next if no instruction is currently being input to the code buffer.

Program count (PC)—the address of the location from which an instruction is currently being taken or is to be taken next if no instruction is currently being output from the code buffer.

Old PC—the address in the PC just prior to the last change in the PC.

The IA, PC, and old PC are stored in registers in the code buffer's controlling logic.

If, at a given time, at least one loop is presently in the code buffer and the PC does not address an instruction that is after all instructions that are in loops currently in the code buffer, then the code buffer is said to be in its loop present state; otherwise the code buffer is said to be in its loop not present state. A code buffer reset causes the code buffer to go to its loop not present state.

When the code buffer is in its loop present state, the following addresses and associated locations are important:

Loop begin (LB)—refers to any branched to address that begins an unnested loop or outer loop in a nest of loops.

Loop end (LE)—refers to any address of a branch instruction that ends an unnested loop or outer loop in a nest of loops.

The LBs and LEs for all unnested loops and outer loops are stored in two first-in, first-out stacks of equal size (one stack for the LBs and one for the LEs) in the code buffer's controlling logic. An address is said to be pushed onto a first-in, first-out stack if it becomes the last address in the stack and is said to be popped from the stack if it is removed from the stack and, of the addresses on the stack, it was the first address pushed onto the stack. When the last address pushed onto the stack is removed from the stack, it is said to be deleted from the stack.

If the process of bringing instructions into, or writing to, the code buffer must cease momentarily, the write process is said to be blocked. Similarly, if the process of taking instructions from, or reading from, the code buffer must cease momentarily, the read process is said to be blocked.

This invention includes the following rules for blocking and unblocking the write and read processes, changing between the loop present and loop not present states, and changing the LB and LE stacks:

1. When in the loop not present state, writing is blocked if and only if the IA has become equal to the PC due to the incrementing of the IA (i.e., the IA has advanced so far that it has overtaken the PC while writing into the circular memory). The instruction addressed by the PC and the instructions after this instruction, but before the instruction addressed by the IA are said to be unprocessed instructions. Writing becomes unblocked as soon as the current instruction has completed its execution and another read has begun or the code buffer is reset.

2. When in the loop present state, writing is blocked if and only if the IA has become equal to the PC due to the incrementing of the IA or the IA has become equal to the LB that is to be popped from the LB stack next (i.e., it is the LB that is before all other LBs in the stack) or the next instruction to be brought in is a backward branch that does not cause deletions from the LB and LE stacks and these stacks are full. The instruction that is addressed by the LB that is to be popped next and all instructions that are after this instruction, but before the instruction that is after the instruction addressed by the LE that is to be popped last, are said to be within an unprocessed instruction loop. Writing becomes unblocked when, because of instructions being executed or a code buffer reset, the blocking condition becomes no longer present.

3. Reading is blocked if and only if the instruction addressed by the PC is not before the instruction addressed by the IA. This could happen due to normal sequencing (i.e., incrementing to address the next instruction) or a forward inside branch. Reading becomes unblocked when the IA increments past the PC (i.e., becomes equal to the contents of the PC module P and then to the contents of the PC plus 1 module P) or the code buffer is reset. Blocking and unblocking the read process does not depend on whether or not the code buffer is in its loop present state.

4. A reset causes the LB and LE stacks to become empty.

5. An LB and LE are pushed onto their respective stacks when the stacks are not full and an inside backward branch is input that establishes an unnested loop. If the stacks are full, the write process will become blocked by rule 2, but as soon as instruction execution (but not a reset) causes the stack to become not full the LB and LE will be pushed onto their respective stacks. In either case the code buffer will end up in its loop present state.

6. If a backward branch causes an outer loop to be established, then all LBs and LEs for the loops that are within this outer loop will be deleted from their respective stacks and then the LB and LE for the new outer loop will be pushed onto their respective stacks.

7. If the LB and LE stacks are not empty and instruction execution causes the PC to increment past or branch to an instruction after one or more LEs, then those LEs and their corresponding LBs will be popped from their respective stacks. If no loop is pending and the stack becomes empty, then the loop not present state will be entered. If another loop is pending, then the LB and LE of the pending loop will be pushed onto the stack.

In the preferred embodiment described below the LB and LE stacks have a length of one (i.e., the stacks are reduced to registers), in which case rules 2, 4, 5, 6, and 7 become:

2'. When in the loop present state, writing is blocked if and only if the IA has become equal to the PC due to the incrementing of the IA or the IA has become equal to the LB or the next instruction to be brought in is an inside backward branch that does not establish an outer loop. Writing becomes unblocked when, because of instructions being executed or a code buffer reset, the blocking condition becomes no longer present.

4'. A reset causes the contents of the LB and LE registers to become meaningless.

5'. When the code buffer is in its loop not present state and an inside backward branch is input that establishes an unnested loop, the LB and LE are put into their respective registers, and the loop present state is entered. If the code buffer is in its loop present state and an inside branch that establishes an unnested loop is to be input, the write process becomes blocked by rule 2', but as soon as instruction execution (but not a reset) causes the code buffer to exit its loop present state and writing to become unblocked, the new LB and LE are put into their respective registers and the loop present state is reentered.

6'. If a backward branch causes an outer loop to be established, then the current contents of the LB and LE registers ar replaced by the LB and LE of this outer loop.

7'. If the code buffer is in its loop present state and an instruction execution causes the PC to increment past or branch to an instruction after the instruction addressed by the LE register, then, if no loop is pending, the code buffer will enter its loop not present state and the contents of the LB and LE registers will become meaningless. If another loop is pending, then the LB and LE of the pending loop will be put in their respective registers.

Figure 1:
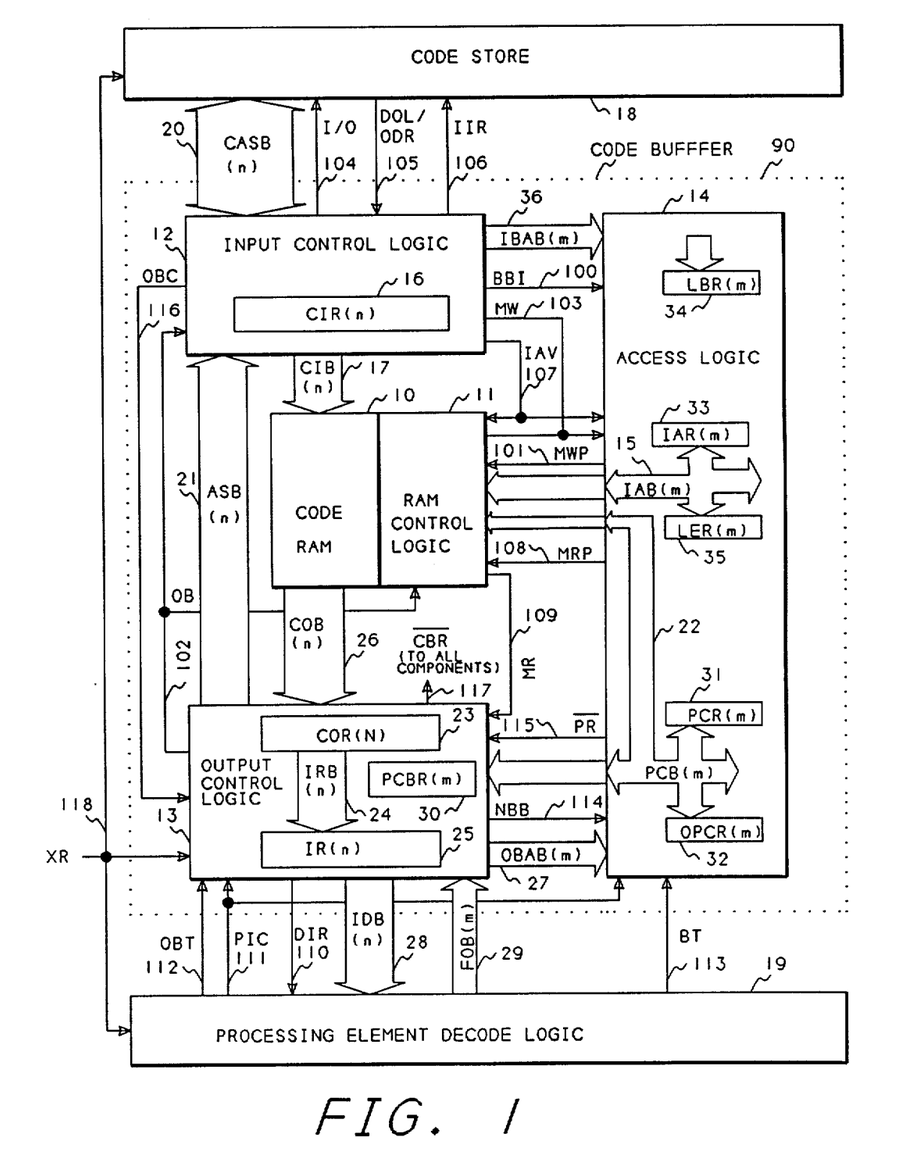
FIG. 1 is a block diagram showing the major components of the code buffer and how the code buffer is integrated into a computer.

FIG. 1 shows the four major components of the code buffer 90, the connections and bus between the code buffer 90 and the code store 18, the connections and buses between the code buffer and the processing element decode logic 19, the connections and buses between the four major components, and the principal registers and buses within the four major components. The bus and register widths are given in parentheses. It is seen from the width of the instruction buses and registers that the instructions are assumed to be n bits wide and from the width of the buses and registers that hold or transmit code buffer addresses that the number of locations in the code buffer is $P=2^m$.

The code RAM 10 is the actual buffer memory and the RAM control logic 11 controls the flow of instructions into and out of the memory. When the access logic 14 has determined that a memory write may proceed, the access logic 14 outputs a memory write permission (MWP) signal 101 and a code RAM address over the input address bus (IAB) 15 to the RAM control logic 11. After receiving the MWP signal 101, the RAM control logic 11 determines whether or not the circuitry needed to write to the address on the IAB 15 is busy. If, or as soon as, this circuitry is not busy, the outside branch (OB) signal 102 indicates address status is not being output, and the instruction available (IAV) signal 107 indicates an instruction is available for input, the RAM control logic 11 reserves the circuitry needed for the write and generates a memory write (MW) pulse 103. The MW pulse 103 is sent to the code RAM 10 where it causes the instruction on the code input bus (CIB) 17 to be written into the location whose address is on the IAB 15. The MW pulse 103 is also sent to the access logic 14 where it causes the MWP 101 to be reset, and to the input control logic 12. The width of the MW pulse 103 must be longer than the time required to perform a write to the code RAM 10.

When the input control logic 12 receives the MW pulse 103 it resets IAV signal 107 and enters input mode where it supervises the input of an instruction from the code store 18 to the code input register (CIR) 16. In the input mode the I/O signal 104 sent from the input control logic 12 to the code store 18 is reset and the signals on the code-address-status bus (CASB) 20 are gated to the CIR 16 (i.e., the input control logic's transceivers are set to receive and connect the CASB 20 to the CIR 16).

It is assumed that the code store 18, which is not part of this invention, is constructed so that when I/O signal 104 is reset, the code store 18 enters its output mode, and the data on line/output data received (DOL/ODR) signal 105 assumes the data on line (DOL) meaning and is reset. Then, when the code store's input instruction request (IIR) signal 106 is set, the code store 18 will place an instruction on the CASB 20 and then set the DOL/ODR signal 105. When the code store 18 detects that IIR signal has been reset, it will cease outputting to the CASB 20 and reset the DOL/ODR signal 105, thereby completing the output of an instruction.

If the code store 18 is constructed as described, when the DOL/ODR signal 105 is reset, the input control logic 12 enters its input mode, and sets the IIR signal 106. After the code store puts an instruction on the CASB 20 and sets DOL/ODR signal 105, input control logic 12 will detect the DOL/ODR signal and wait until a time $T_A$ has elapsed from the beginning of the MW pulse 103 (where $T_A$ equals the MW pulse width plus $T_C$, which is defined in the description of the access logic 14). Input control logic 12 then latches the instruction on the CASB 20 into the CIR 16, resets the IIR signal 106, and sets the instruction available (IAV) signal 107 to the RAM control logic 11 and the access logic 14. The IAV being set allows the access logic 14 to initiate another memory write if, or as soon as, the write process is unblocked.

The input control logic 12 also continually monitors the contents of the CIR 16 and if the contents are an inside backward branch instruction it outputs a backward branch input (BBI) signal 100 to the access logic 14. In addition, the bits in the CIR 16 that contain the relative address displacement when the CIR 16 contains an inside branch instruction are continually output to the input branch address bus (IBAB) 36.

When the access logic 14 determines that a memory read may proceed, it sets the memory read permission (MRP) signal 108 and sends a code RAM address over the program count bus (PCB) 22 to the RAM control logic 11. After detecting the MRP signal 108, the RAM control logic 11 determines whether or not the circuitry needed to read from the address on the PCB 22 is busy. If, or as soon as, this circuitry is not busy the RAM control logic 11 reserves the circuitry needed for the read and generates a memory read (MR) pulse 109. The MR pulse 109 is sent to the output control logic 13 and to the code RAM 10 where it causes the contents of the location whose address is on the PCB 22 to be read and put on the code output bus (COB) 26. The width of the MR pulse 109 must be longer than the time required for the read.

When the output control logic 13 receives the leading edge of the MR pulse 109, it latches the contents of the code output register (COR) 23, which are currently on the instruction register bus (IRB) 24, into the instruction register (IR) 25, and sends a decode instruction request (DIR) signal 110 to the processing element decode logic 19. The trailing edge of the MR pulse 109 causes the signals on the COB 26 to be latched into the COR 23.

It is assumed that the processing element decode logic 19, which is not part of this invention, is constructed so that when its DIR input 110 is set, it resets its present instruction complete (PIC) output 111 and begins decoding and executing the instruction on the instruction decode bus (IDB) 28. If the instruction is an outside branch whose branch condition is satisfied, the processing element decode logic 19 sends an outside branch true (OBT) signal 112 and leaves its PIC 111 and branch true (BT) 113 outputs reset. Otherwise, when the processing element decode logic 19 completes the instruction's execution it sends a PIC signal 111 to both the output control logic 13 and the access logic 14. If the instruction is an inside branch whose branch condition is satisfied, the processing element decode logic 19 also sends a BT signal 113 to the access logic 14; otherwise, it resets the BT signal 113. The flags output bus (FOB) 29 is used to continually output the processing element decode logic 19 flags to the output control logic 13 where they become part of the address-status bus (ASB) 21.

When the access logic 14 detects reset of the PIC signal 111, it resets its MRP signal 108. When the output control logic 13 detects that the PIC signal 111 is set, it clears the DIR signal 110. The arrival of a PIC signal 111 at the access logic 14 makes it possible for another read to begin if, or as soon as, the read process is unblocked.

The output control logic 13 also monitors the contents of the IR 25 and if it does not contain an inside backward branch the output control logic 13 sends a not backward branch (NBB) signal 114 to the access logic 14. In addition, those bits in the IR 25 that contain the relative address displacement (when the IR 25 contains an inside branch instruction) are continually output from the output control logic 13 to the access logic 14 over the output branch address bus (OBAB) 27.

Also, the output control logic 13 has a partial reset ($\overline{PR}$) input 115 which receives a reset (i.e., the pulse's leading edge is from 1 to 0) from the access logic 14 when an inside branch is made. The $\overline{PR}$ pulse 115 causes no operation (NOP) instructions to be put in the COR 23 and IR 25.

If the processing element decode logic 19 sends an OBT signal 112 instead of a PIC signal 111, then the output control logic 13 outputs an OB signal 102 to the RAM control logic 11 and to the input control logic 12 and latches the PCB 22 into the program count bus register (PCBR) 30. The contents of the PCBR 30, the bits of the IR 25 that are the branch address when the IR 25 contains an outside branch instruction, and the PIC signals on the FOB 29 are continually applied to the ASB 21.

The arrival of the OB signal 102 at the RAM control logic 11 prevents any further code RAM writes from being initiated. The arrival of the OB signal 102 at the input control logic 12 resets the outside branch complete (OBC) signal 116 to the output control logic 13 and if, or as soon as, there is no code RAM write in progress (which would be indicated by both the DOL-/ODR 105 and IIR 106 signals being reset) the input control logic 112 enters its output mode. Entering the output mode sets the I/O signal 104, changes the CASB 20 to an output bus (by making the transceivers drivers), and connects the ASB 21 to the CASB 20 via the transceivers. It is assumed that the code store 18 is constructed so that it will, when I/O signal 104 is set, latch the signals on the CASB 20 and send an output data received (ODR) signal 105 to the input control logic 12. Upon detection of the DOL/ODR signal 105, the input control logic 12 resets the I/O signal 104 and sets the OBC signal 116 to the output control logic 13. Upon detecting the setting of the OBC signal 116, the output control logic 13 resets the OB signal 102 and sets the code buffer reset ($\overline{CBR}$) pulse 117.

Either setting external reset (XR) pulse 118 or the OBC signal 116 will cause the output control logic 13 to send a $\overline{CBR}$ pulse 117 to its own circuitry, the RAM control logic 11, the input control logic 12, and the access logic 14. A $\overline{CBR}$ pulse 117 causes the RAM control logic 11 to reset in such a way that it does not output an MW pulse 103 or MR pulse 109; the input control logic 12 to go into input mode with the I/O signal being reset, the signals IIR 106 and OBC 116 being set, the output IAV 107 being reset, and the CIR 16 being set to a NOP instruction (thus, the BBI signal 100 is reset); the output control logic 13 to reset the OB signal 102 and set the DIR signal 110, set all the bits in the PCBR 30, and fill the COR 23 and IR 25 with NOP instructions; set the access logic 14 to its loop not present state, set all the bits in its program count register (PCR) 31 and old program count register (OPCR) 32, and reset its input address register (IAR) 33, loop begin register (LBR) 34, and loop end register (LER) 35.

If the XR pulse 118 is set, it is assumed that, not only will the XR pulse 118 reset the $\overline{CBR}$ pulse 117, but the XR pulse 118 will also be sent to the code store 18, which will reset the DOL/ODR output 105 and prepare code store 18 to output an instruction on the CASB 20. The XR pulse 118 will be sent to the processing element decode logic 19, which will reset the OBT signal 112, PIC signal 111, and BT signal 113 and, upon detecting that DIR signal 110 is set, will begin executing the NOP instruction in the IR 25.

Figure 2:
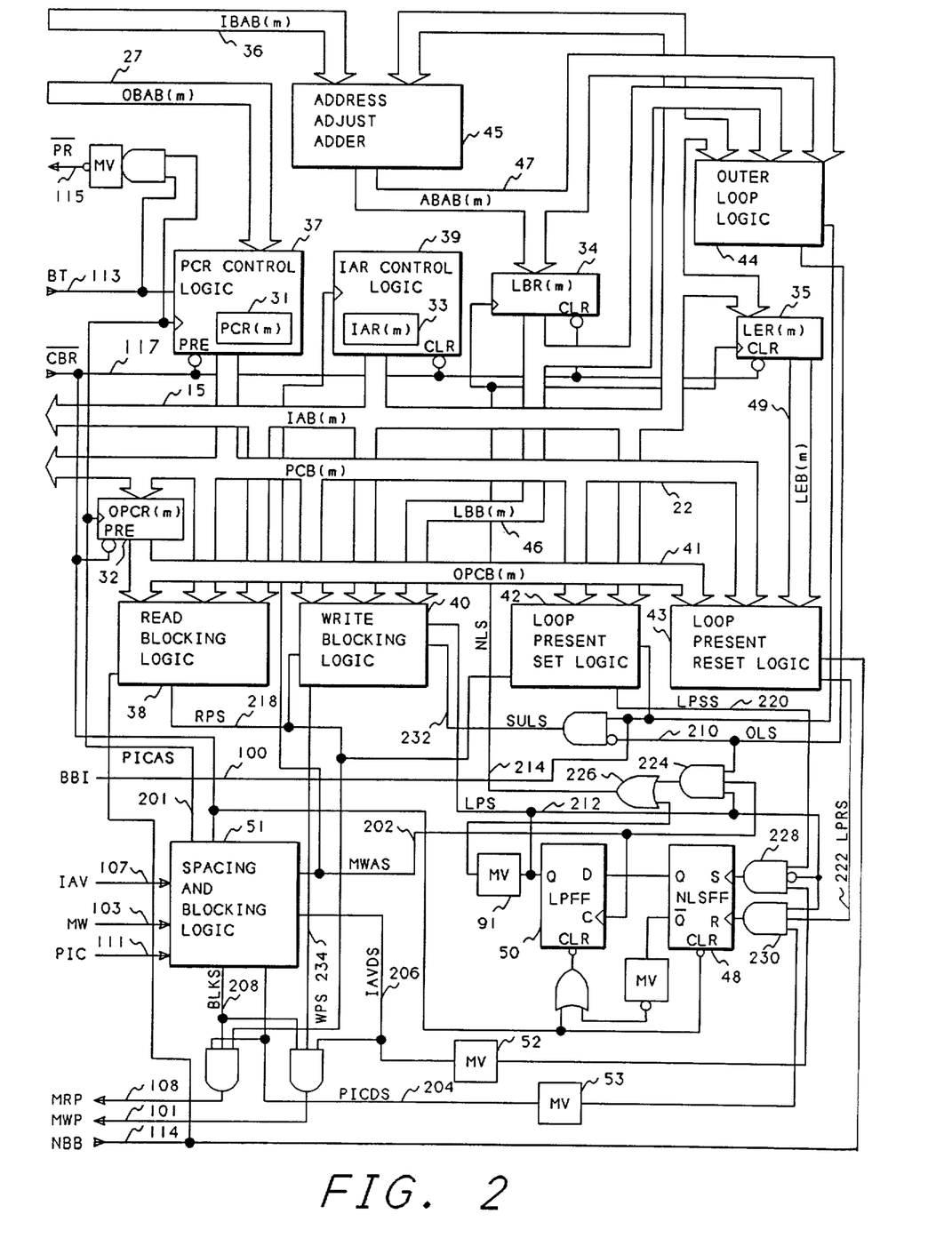
FIG. 2 is a schematic diagram of the code buffer's access logic.

FIG. 2 shows the details of the access logic 14. The purposes of the spacing and blocking logic 51 are to provide guaranteed spacing between the principal signals that control the access logic 14, and to provide a blocking signal that prevents signals MRP 108 and MWP 101 from being set when the access logic 14 is unstable. Let $T_B$ be the time needed for the PCR 31 and the OPCR 32 to change and the access logic 14 to subsequently stabilize; $T_C$ be the time needed for IAR 33 and the loop present flip-flop (LPFF) 50 to change and the access logic 14 to stabilize; $T_D$ be the time needed for CIR 16 (FIG. 1) to change and the access logic to stabilize; and $T_E$ be the time needed for the next loop present state flip-flop (NLSFF) 48 to reset, the LPFF 50 to reset and the subsequent logic to stabilize. The PIC adjusted signal (PICAS) 201, MW adjusted signal (MWAS) 202, and IAV adjusted signal (IAVAS) (which is internal to the spacing and blocking logic and not shown in FIG. 2) are generated by the PIC 111, MW 103, and IAV 107 signals, respectively, and are adjusted to guarantee the needed spacing between these signals. The PIC delayed signal (PICDS) 204 is PICAS delayed by time $T_B$ and the IAV delayed signal (IAVDS) 206 is IAVAS delayed by time $T_D$. When PICAS 201 is set, the blocking signal (BLKS) 208 is reset for length $T_B$ and when MWAS 202 is set the BLKS 208 is reset for length $T_C$.

The purpose of PCR control logic 37 is to update the PCR 31 whose output is continually applied to the PCB 22. The PCR control logic 37 updates the contents of the PCR 31 at the leading edge of the PICAS 201 each time it is set. If, at that time, signal BT 113 is reset the PCR 31 is incremented by one; if signal BT 113 is set, the contents of the PCR 31 are replaced by the sum (module $2^m$) of the relative address displacement on the OBAB 27 and the current contents of the PCR 31. The PICAS 201 going set also causes the OPCR 32 to latch the currett signals on the PCB 22.

The purpose of IAR control logic 39 is to update the IAR 33 whose output is continually applied to the IAB 15. The IAR control logic 39 increments the IAR 33 by one each time the MWAS signal goes set.

The address adjust adder 45 continually outputs to the absolute branch address bus (ABAB) 47 the sum of the relative branch address on the IBAB 36 and the input address on the IAB 15. Therefore, when a branch instruction is in the CIR 16 (shown in FIG. 1), the address on the ABAB 47 is the code RAM address of the branched to instruction.

The outer loop logic 44 monitors the IAB 15, loop begin bus (LBB) 46, ABAB 47, and BBI 100 signals and determines whether or not a new outer loop is to be established. It sets the outer loop signal (OLS) 210 if a new outer loop will be present in the code RAM 10 when the next instruction is written into the code RAM from the CIB 17 (shown in FIG. 1); otherwise, it resets OLS 210. One implementation of the outer loop logic 44 is combinational logic that sets OLS 210 if the following is true and resets OLS 210 if the following is false:

BBI=1 AND [(ABAB)>(LBB) exclusive OR
 (IAB)>(LBB) exclusive OR (ABAB)>(IAB)]

where the parentheses mean "the contents of" and the brackets indicate that the exclusive ORs are to be taken before the AND.

Either the loop present signal (LPS) 212 being set, which occurs when the loop present state is entered, or the OLS 210 being set when the next instruction is brought in will cause the new loop signal (NLS) 214 to be set. A NLS pulse 214 going set (in accordance with rules 5' and 6') causes the LBR 34 to latch the ABAB 47 and the LER 35 to latch the IAB 15.

The read blocking logic 38 monitors the PCB 22, the IAB 15, the old program count bus (OPCB) 41 (whose signals are the outputs of the OPCR 32), and the NBB signal 114 and determines whether or not (according to rule 3) reading is blocked. It resets read proceed signal (RPS) 218 if reading is blocked and sets RPS 218 if reading is not blocked. One implementation of the read blocking logic 38 is combinational logic that resets RPS 218 if the following is true and sets RPS 218 if the following is false:

NBB=1 AND [(PCB)>(OPCB) exclusive OR (IAB)>(OPCB) exclusive OR (PCB)≧(IAB)]

The loop present set logic 42 monitors the PCB 22, the IAB 15, and the RPS 218 and BBI 108 signals and sets loop present set signal (LPSS) 220 if the code buffer is to enter its loop present state when the next instruction is input to the code RAM; otherwise it resets LPSS signal 220. One implementation of this logic is combinational logic that sets LPSS 220 when the following is true and resets LPSS 220 when the following is false:

BBI=1 AND [RPS=1 OR (PCB)=(IAB)]

The loop present reset logic 43 monitors the OPCB 41, the PCB 22, the LEB 49, and the NBB signal 114 and sets loop present reset signal (LPRS) 222 if the code buffer is to enter its loop not present state (according to Rule 7' and the definition of the loop not present state) when the execution of the next instruction is complete; otherwise, it resets LPRS 222. One implementation of this logic is combinational logic that sets LPRS signal 222 if the following is true and resets LPRS 222 if the following is false:

NBB=1 AND [(LEB)≧(PCB) exclusive OR (LEB)≧(OPCB) exclusive OR (OPCB)≧(PCB)]

When the IAV signal 107 is set, indicating a new instruction has been latched into the CIR 16 (shown in FIG. 1), the IAVDS 206 is set which causes the monostable multivibrator (MV) 52 to generate a set pulse that is ANDed (by AND gate 228) with the LPSS 220 and the inverted LPS 212 to (possibly) trigger the set (S) input of the NLSFF 48. The LPS signal 212 is set if the code buffer is in its loop present state; otherwise it is reset. When the PIC 111 becomes set (which indicates that a new instruction is to be taken from the code RAM 10), it produces the PICDS 204 which causes the MV 53 to generate a set pulse that is ANDed (by AND gate 230) with the LPRS 222 and LPS 212 to (possibly) trigger the reset (R) input to the NLSFF 48. When the MW pulse 103 is reset (which signals the end of a write), it produces the MWAS 202 set pulse which latches the output of the NLSFF into the LPFF 50. Therefore, following the end of a write the LPFF 50 is set if the code buffer is to be in its loop present state and reset if the code buffer is to be in its loop not present state. The output of the LPFF 50 is the LPS signal 212.

The MWAS 202 is also ANDed (by AND gate 224) with the OLS 210 and the LPS 212 and the output of this AND is ORed (by OR gate 226) with the output of the multivibrator 91 which is triggered by a reset to set transition of the LPS signal 212. The output of the OR 226, which is a pulse caused by an unnested loop or a new outer loop entering the code buffer, is the NLS signal 214 that causes (in accordance with rules 5' and 6') the LBR 34 and LER 35 to latch new contents.

The write blocking logic 40 monitors the PCB 22, the IAB 15, the LBB 46, the RPS 218, the LPS 212, and the second unnested loop signal (SULS) 232, which is the AND of the BBI signal 100 and the inverted OLS signal 210. It resets (according to Rules 1 and 2') write proceed signal (WPS) 234 if writing is blocked and sets WPS signal 234 if writing is not blocked. One implementation of this logic is combinational logic that resets WPS signal 234 if the following is true and sets WPS signal 234 if the following is false:

[(PCB)=(IAB) AND RPS=1] OR [LPS=1 AND SULS=1] OR [(IAB)=(LBB) AND LPS=1]

The MWP signal 101 is the AND of the WPS signal 234, the BLKS 208, and the IAVDS 206. Therefore, the MWP 101 is set if the WPS 234 is set any time after the IAVDS 206 becomes set, except when the BLKS 208 disables the AND gate while the access logic is unstable. The MRP signal 108 is the AND of the RPS 218, the BLKS 208, and the PICDS 204 signals. Therefore, the MRP 108 is set if the RPS 218 is set any time after the PICDS 204 becomes set, except when the BLKS 208 disables the AND gate while the access logic is unstable.

Figure 3:
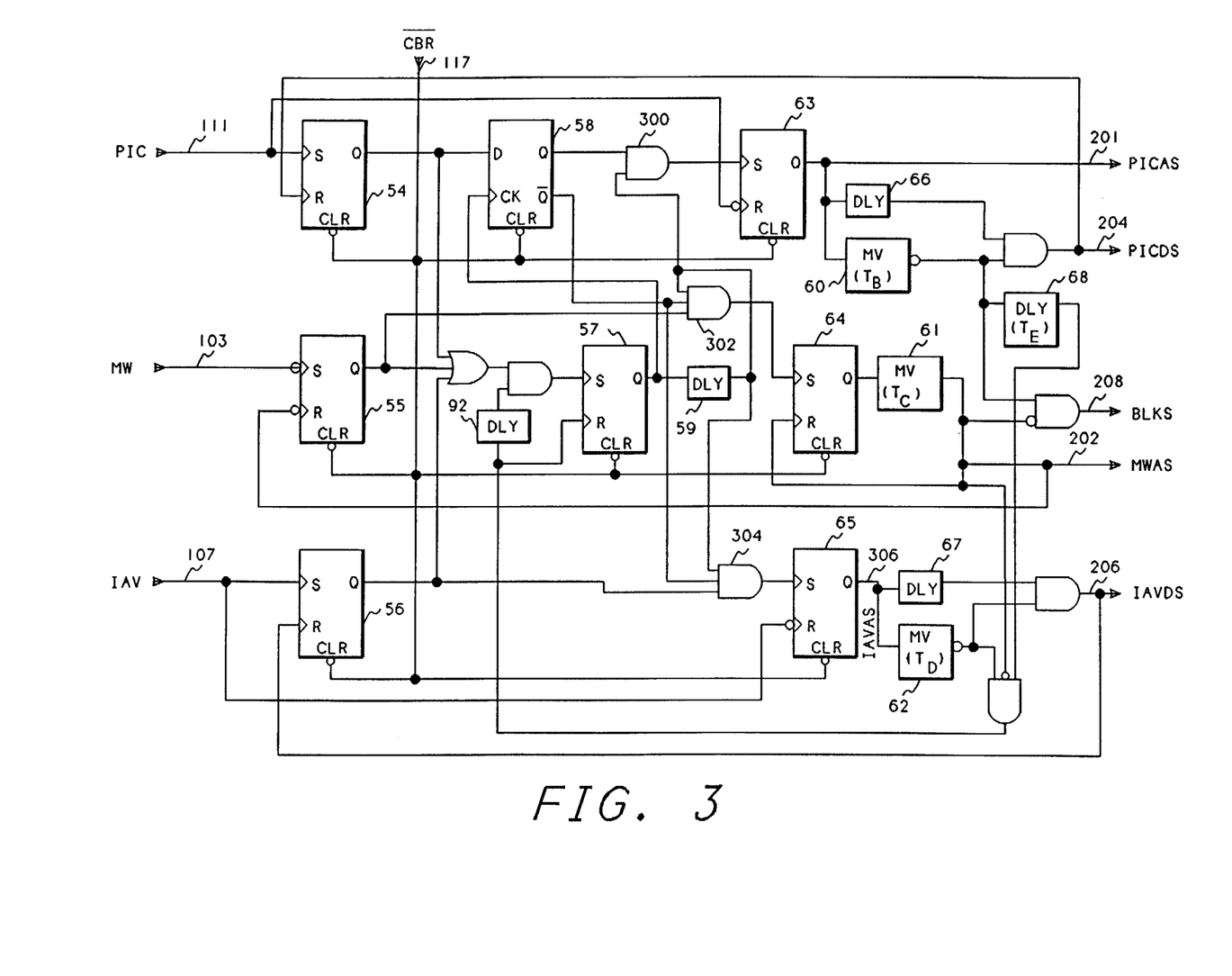
FIG. 3 is a logic diagram of the access logic's spacing and blocking logic.

FIG. 3 is an implementation of the spacing and blocking logic 51. The flip-flop (FF) 54, 55, or 56 is set by a reset to set transition of the PIC signal 111, a set to reset transition of the MW pulse 103, or a reset to set transition of the IAV signal 107, respectively. If any of these flip-flops are set, then FF 57 is set (possibly after a delay), which causes FF 58 to latch the output of FF 54. After delay (DLY) 59 has given time for FF 58 to switch, the output of DLY 59 enables the AND gates 300, 302, and 304 connected to its output. If FF 58 is 1 (which means the PIC signal 111 is set) then FF 63 is set and the PICAS signal 201 becomes set. If FF 58 is reset (which means the end of an MW pulse 103 or the IAV signal 107 becoming set has occurred and the PIC 111 is reset) then either FF 64 is set and the MWAS pulse 202 is output (if FF 55 is set) or FF 65 is set and the IAVAS signal 306 becomes set (if FF 56 is set). The MVs 60, 61, and 62 have pulse widths of $T_B$, $T_C$, and $T_D$, respectively, and the DLYs 66 and 67 have delays just longer than the switching times of MV 60 and 62. The AND of MV 60 and DLY 66 is the PICDS 204, the AND of MV 62 and DLY 67 is the IAVDS 206, and the AND of MV 60 and the inversion of MV 61 is the BLKS 208.

The FFs 54, 55, and 56 are reset by the PICDS 204, the inversion of the MWAS 202, and the IAVDS 206, respectively. Also, the FF 57 is reset by the AND of the outputs of MV 60 delayed by time $T_E$ (in delay circuit 68), the inverted output of MV 61, and the output of MV 62. ($T_E$ must be less than $T_B$ by a time sufficient to guarantee that the S input to FF 57 is reset before PICDS 204 becomes set.) Because the reset to FF57 is delayed from the PIC signal 111, the trailing edge of the MW pulse 103, and the IAV signal 107 by at least times $R_B+T_E$, $T_C$, and $T_D$, respectively, the required spacing is guaranteed. The signal that resets FF 57 is input to DLY 92 whose delay time is longer than the switching times of FF 54, FF 55, FF 56, or FF 57. The output of DLY 92 guarantees a reset to set transition at the S input to FF 57 when another input signal is waiting, but is long enough that the last input signal has been reset. FF 63 is reset by a set to reset transition of the PIC signal 111, FF 64 is reset by the output of MV 61, and FF 65 is reset by a set to reset transition of the IAV signal 107. A $\overline{CBR}$ pulse 117 causes all FFs to be reset.

Figure 4:
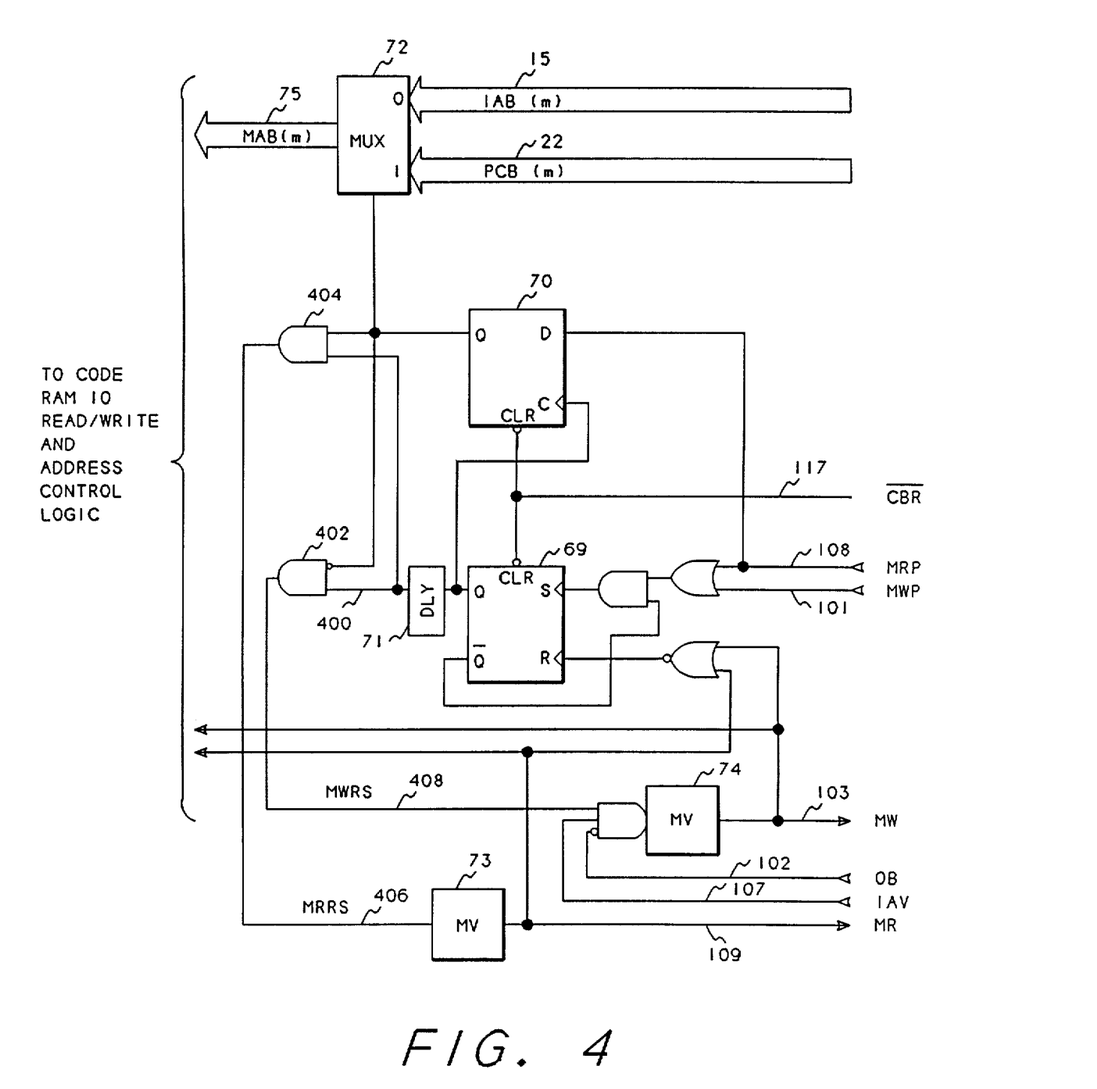
FIG. 4 is a logic diagram of the code buffer's RAM control logic.

FIG. 4 shows an implementation of the RAM control logic 11 that assumes reading from and writing to the code RAM 10 cannot be done at the same time. Either an MRP 108 or MWP 101 signal causes FF 69 to be set and the Q output of FF 69 causes FF 70 to latch the MRP signal 108. After DLY 71 delays the Q output of FF 69 long enough to allow FF 70 to switch, the output 400 of DLY 71 enables the AND gates 402 and 404 connected to the output of FF 70. If the MRP signal 108 is set then the output of FF 70 is set and the memory read request signal (MRRS) 408 becomes set; otherwise, the MWP signal 101 is set and the memory write request signal (MWRS) 408 becomes set. If the MRRS 406 becomes set an MR pulse 109 is output to the code RAM 10 and the output control logic 13. If the MWRS 408 becomes set then, or as soon as the OB input 102 is reset and the IAV input 107 is set, an MW pulse 103 is output to the code RAM 10, the access logic 14, and the input control logic 12. The trailing edge of either a MR 109 or MW 103 pulse resets FF 69, thereby allowing the MRP 108 or MWP 101 signal (if set) to initiate another memory access. The Q output of FF 70 is also input to the multiplexer (MUX) 72 which, when reset, selects the IAB 15 to be output to the code RAM 10 over the memory address bus (MAB) 75 or, when set, selects the PCB 22 to be output over the MAB 75. A $\overline{CBR}$ pulse 117 causes FF 69 and FF 70 to be cleared; thus, neither an MW 103 nor MR 109 pulse will be generated until MWP 101 or MRP 108 becomes set.

Figure 5:
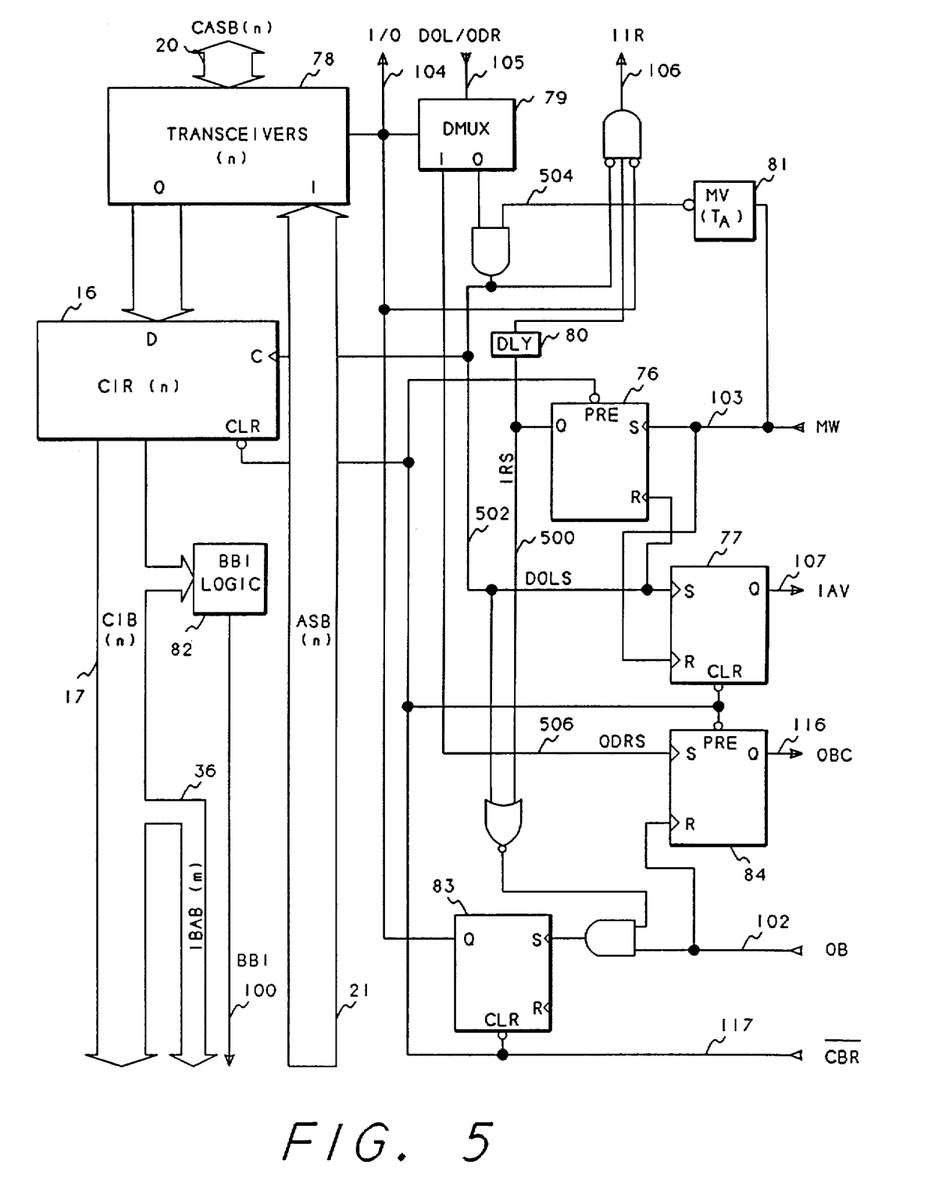
FIG. 5 is a logic diagram of the code buffer's input control logic.

FIG. 5 gives an implementation of the input control logic 12. First assume that the OB signal 102 is reset, the I/O signal 104 is reset, and an MW pulse 103 is input. The I/O signal 104 being reset causes the transceivers 78 to receive from the CASB 20 and output to the CIR 16, and the demultiplexer (DMUX) 79 to cause the DOL signal (DOLS) to become the DOL/ODR input. The MW pulse 103 sets FF 76 which causes the instruction request signal (IRS) 500 to become set. After a delay through DLY 80, which is long enough to guarantee that an OB signal 102 is not in the process of changing the I/O signal 104, the IRS 500 is ANDed with the inversions of the DOLS 502 and the I/O signal 104. If both the DOLS 502 is reset (meaning the previous input is complete) and I/O signal 104 is reset, then the IRS 500 causes the IIR signal 106 to become set. After the code store 18 puts an instruction on the CASB 20 and sets the DOL/ODR signal 105 and the inverted output 504 of MV 81 has set, CIR 16 latches the CASB 20, the IIR signal 106 resets, FF 76 is reset so that the IRS 500 resets, FF 77 is set, and the IAV output 107 becomes set. The width of the output 504 by MV 81 is time $T_4$, thereby guaranteeing that at least time $T_4$ will elapse between the beginning and ending of the input process.

The CIR 16 outputs to the CIB 17 and those bits that provide the relative address displacement when the CIR 16 contains an inside branch instruction are output over the IBAB 36. The BBI logic 82 sets BBI signal 100 when the CIR 16 contains an inside backward branch instruction; otherwise it resets the BBI signal 100.

Now assume that the OB input 102 becomes set. Then FF 84 is reset, resulting in the OBC output 116 going reset, and FF 83 is set if, or as soon as, an input is not in progress, which is indicated by both the IRS 500 and DOLS 502 signals being reset. This sets I/O signal 104 which cause the transceivers 78 to output the ASB 21 over the CASB 20 and the ODR signal (ODRS) 506 to become the DOL/ODR input. When the code store 18 detects the I/O signal 104 it latches the CASB 20 and raises the DOL/ODR signal 105, and thereby sets the ODRS signal 506. The ODRS 506 sets FF 84, thus causing the OBC output 116 to set.

A $\overline{CBR}$ pulse 117 causes FF 76 and FF 84 to be set and FF 77 and FF 83 to be reset, thus putting the input control logic 12 into its input mode with the IIR 106 and OBC 116 outputs being set and the I/O 104 and the IAV 107 signals being reset. The $\overline{CBR}$ pulse 117 also resets the CIR 16, which causes the CIR 16 to output a NOP instruction.

Figure 6:
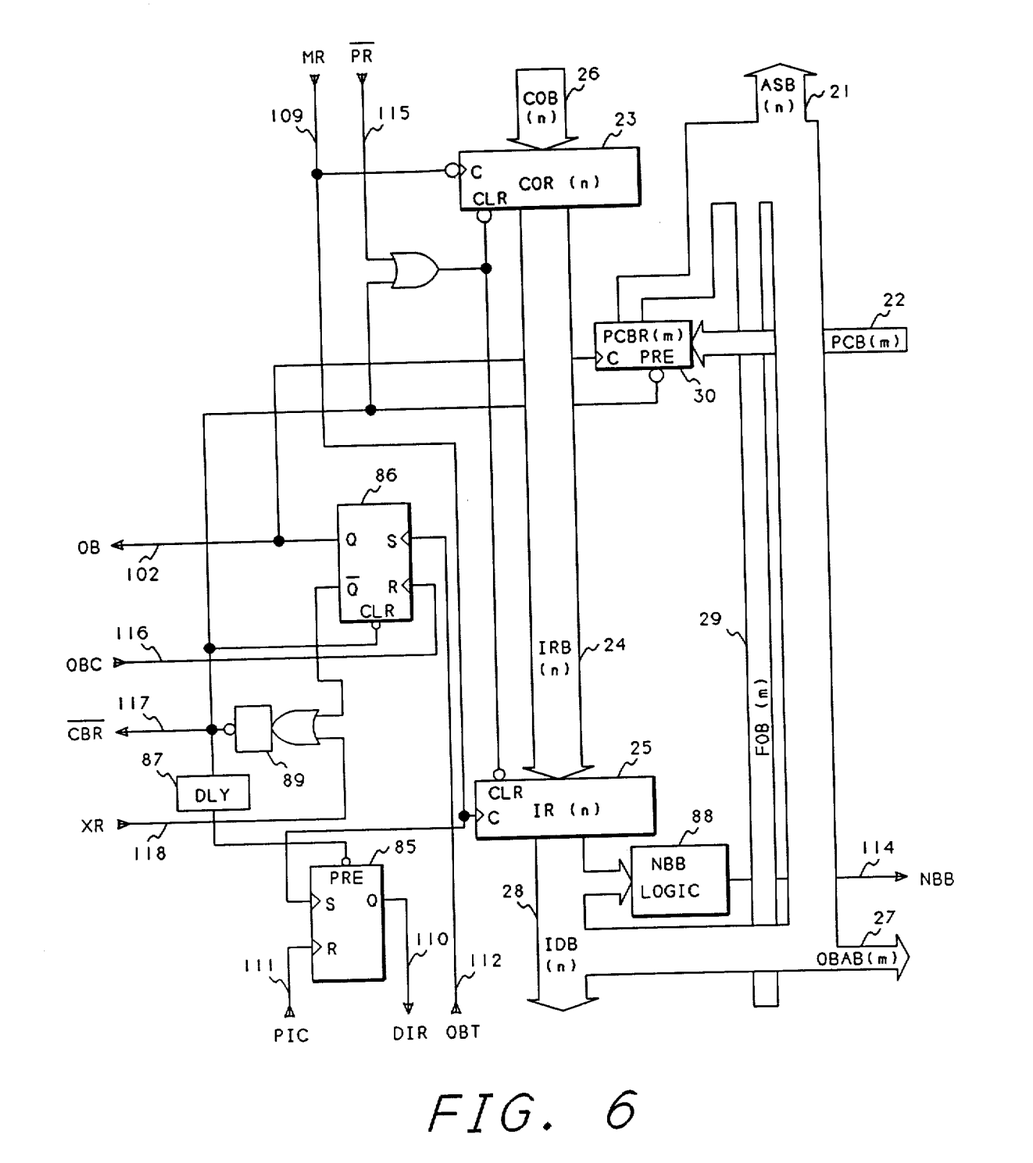
FIG. 6 is a logic diagram of the code buffer's output control logic.

FIG. 6 gives an implementation of the output control logic 13. When an MR pulse 109 arrives, its leading edge latches the IRB 24 into the IR 25 and sets FF 85, and its trailing edge latches the COB 26 into the COR 23. The Q output of FF 85 is the DIR output 110. When the processing element decode logic 19 (FIG. 1) receives the DIR 110 it clears its PIC 111, OBT 112, and BT 113 signals and executes the instruction in the IR 25. If the instruction is not an outside branch whose condition is satisfied, the processing element decode logic 19 sets its PIC output 111 (and leaves its OBT output reset) when execution is complete. The PIC signal 111 causes FF 85 to reset. If the instruction is an outside branch whose condition is satisfied, the processing element decode logic 19 sets its OBT output 112 (and leaves its PIC output reset). The OBT signal 112 causes FF 86 to be set and it sets the OB signal 102. The OB signal 102 is output to the input control logic (FIG. 1) and causes the PCBR 30 to latch the PCB 22. Then the input control logic 12 resets the OBC signal 116 and then sets it when the address-status output over ASB 21 and CASB 20 is complete. The reset to set transition of the OBC signal 116 causes FF 86 to reset, which sets the $\overline{CBR}$ pulse 117. The $\overline{CBR}$ pulse 117 causes all bits of the COR 23 and the IR 25 to be reset and all bits of PCBR 30 to be set. After a delay through DLY 87 that is just long enough to allow IR 25 to be cleared, the delayed $\overline{CBR}$ pulse 600 also presets FF 85 so that an instruction execution will begin. The XR input becoming set also causes a $\overline{CBR}$ pulse 117 to be generated.

The output of the PCBR 30, the FOB 29, and the bits of the IR 25 that contain the outside branch address when the IR 25 contains an outside branch form the contents of the ASB 21. The bits in the IR 25 that contain the relative address displacement when the instruction in the IR 25 is an inside branch are output to the OBAB 27. The NBB logic 88 sets the NBB signal 114 if the instruction in IR 25 is not an inside backward branch; otherwise it resets NBB signal 114.

What is claimed is:

1. Code buffer apparatus for accepting processor instructions from a code store and transferring said processor instructions to a processing element, said code buffer comprising:
    a random access memory containing P elements;
    an input address register;
    a program counter register;
    input transfer means for transferring said processor instructions from said code store to said random access memory at a location addressed by said input address register;
    output transfer means for transferring said processor instructions at a location addressed by said program counter register from said random access memory to said processing element;
    input access logic means for controlling said input transfer means to block transfer into said random access memory when said input address register addresses a location that is occupied by an unprocessed instruction or when said input address register addresses a location that is within an unprocessed instruction loop; and output access logic means for controlling said output transfer means to block transfer out of said random access memory when said program counter register does not address an unprocessed instruction or said program counter register does not address an instruction within an unprocessed instruction loop.

2. The code buffer apparatus as defined in claim 1 wherein said input access logic means comprises:
   loop begin stack means for storing a plurality of loop begin addresses;
   loop end stack means for storing a plurality of loop end stack addresses;
   loop present state means having a value of set or reset;
   means for blocking said input transfer if said input address register increments to become equal to said program counter register; and
   means for blocking said input transfer means if said loop present state means is set and said input address register is equal to the first of said loop begin addresses stored in said loop begin stack.

3. The code buffer apparatus as defined in claim 2 further comprising:
   means for detecting an inside backward branch instruction containing an address in said random access memory;
   means for storing said inside backward branch instruction address in said loop begin stack when said inside backward branch is detected;
   means for storing said input address register in said loop end stack when said inside backward branch is detected;
   means for coupling said loop end stack address with said loop begin stack address; and
   means for setting said loop present state means when said inside backward branch is detected.

4. The code buffer apparatus as defined in claim 3 further comprising means for detecting that said inside backward branch established an outer loop containing one or more inner loops and means for removing said loop begin and said loop end stack addresses for all said inner loops contained in said outer loop.

5. The code buffer apparatus as defined in claim 3 further comprising:
   means for detecting an address in said program counter register that points to an instruction that is after an instruction pointed to by one of said loop end stack addresses; and
   means responsive to said detecting means for removing said loop end stack address and said coupled loop begin stack address.

6. The code buffer apparatus as defined in claim 5 further comprising:
   means for detecting that said loop begin and said loop end stacks are empty; and
   means for resetting said loop present state means when said loop begin and said loop end stacks are empty.

7. The code buffer apparatus as defined in claim 2 further comprising means for blocking said input transfer means if said loop begin stack is full.

8. The code buffer apparatus as defined in claim 1 wherein said output access logic means comprises means for blocking said output transfer means when said program counter register points to an instruction that is not before an instruction pointed to by said input address register.

9. The code buffer apparatus as defined in claim 1 wherein said input access logic means comprises:
   loop begin register means for storing a loop begin address;
   loop end register means for storing a loop end address;
   loop present state means having a value of set or reset;
   means for blocking said input transfer means if said input address register increments to become equal to said program counter register; and
   means for blocking said input transfer means if said loop present state means is set and said input address register becomes equal to said loop begin address stored in said loop begin register.

10. The code buffer apparatus as defined in claim 9 further comprising:
    means for detecting an inside backward branch instruction containing an address in said random access memory;
    means for storing said inside backward branch instruction address in said loop begin register when said inside backward branch is detected;
    means for storing said input address register in said loop end register when said inside backward branch is detected; and
    means for setting said loop present state means when said inside backward branch is detected.

11. The code buffer apparatus as defined in claim 10 further comprising:
    means for detecting an address in said program counter register that points to an instruction that is after an instruction pointed to by one of said loop end register address;
    means responsive to said detecting means for indicating said loop end and said loop begin registers are empty; and
    means for resetting said loop present state means when said loop begin and said loop end registers are empty.

12. The code buffer apparatus as defined in claim 9 further comprising means for blocking said input transfer means if said loop begin register is full.

13. A method of buffering instructions being transferred from a code store to decode logic of a processing element, which comprises the steps of:
   (a) transferring said instructions from said code store;
   (b) writing said instructions in a random access memory, having P storage locations, at an address specified by an input address register;
   (c) blocking said writing when said input address register addresses a location that is occupied by an unprocessed instruction;
   (d) blocking said writing when said input address register addresses a location that is within an unprocessed instruction loop;
   (e) reading said instructions from said random access memory at a location specified by a program counter register;
   (f) transferring said instructions read from said random access memory to said decode logic; and
   (g) blocking said reading when said program counter register does not address an unprocessed instruction or said program counter register does not address an instruction within an unprocessed instruction loop.

14. The method of claim 13 wherein step (c) further comprises the steps of:
- (c)(1) detecting an inside backward branch instruction containing an address in said random access memory;
- (c)(2) setting a loop present state means when said backward branch instruction is detected;
- (c)(3) storing said inside backward branch address in a loop begin stack when said backward branch is detected;
- (c)(4) storing said input address register in a loop end stack when said backward branch is detected;
- (c)(5) coupling said loop end stack address with said loop begin stack address;
- (c)(6) blocking said writing when said loop present state means is not set and said input address register is equal to said program counter; and
- (c)(7) blocking said writing when said loop present state is set and said input address register is equal to a first of said backward branch addresses stored in said loop begin stack.

15. The method of claim 14 further comprising the steps of:
- (c)(8) detecting that said inside backward branch established an outer loop containing one or more inner loops;
- (c)(9) removing said loop begin and said coupled loop end stack addresses for said inner loops contained in said outer loop.

16. The method of claim 15 further comprising the steps of:
- (c)(10) detecting an address in said program counter register that points to an instruction that is after an instruction that is pointed to by one of said loop end stack addresses; and
- (c)(11) removing said loop end stack address and said coupled loop begin address.

17. The method of claim 16 further comprising the steps of:
- (c)(12) detecting that said loop begin and said loop end stacks are empty; and
- (c)(13) resetting said loop present state means when said loop begin and said loop end stacks are empty.

18. The method of claim 1 further comprising the steps of:
- (c)(14) detecting that said loop begin stack is full; and
- (c)(15) blocking said writing when said loop begin stack is 19. The method of claim 13 wherein step g further comprises the step:
- (g)(1) blocking said reading when said program counter points to an instruction that is not before the instructions pointed to by said input address.

20. Code buffer apparatus for buffering processor instructions being transferred from a code store to decode logic in a processing element, said apparatus comprising:
- a RAM having P storage locations;
- an IAR having an address value;
- a PCR having an address value;
- an LB register having an address value;
- an LE register having an address value;
- a loop present state register having a value of set or reset;
- input transfer means for transferring said processor instructions from said code store to said RAM addressed by said IAR value;
- means for blocking said input transfer means when said IAR value increments to become equal to said PCR value;
- means for setting said loop present state register comprising
  - first detection means for detecting an inside backward branch instruction, said instruction having a branch-to address, as said instruction is being transferred from said code store,
  - means responsive to said first detection means for storing said IAR value in said LE register,
  - means responsive to said first detection means for storing said branch-to address in said LB register,
  - setting means responsive to said first detection means for setting said loop present state register;
- means for blocking said input transfer means when said loop present state register is set and said IAR value becomes equal to said LB register value;
- means for detecting an outside loop comprising
  - second detection means for detecting an inside backward branch instruction, said instruction having a branch-to address, as said instruction is being transferred from said code store,
  - means responsive to said second detection means for comparing said branch-to address to said LB register value and replacing said LE register value with said IAR value and replacing said LB register value with said branch-to address if said branch-to address points to an instruction that is before the instruction pointed to by said LB register value;
- means for resetting said loop present state register comprising
  - third detection means for detecting a PCR value that points to an instruction that is after the instruction pointed to by said LE register value,
  - means responsive to said third detection means for emptying said LE register and said LB register,
  - resetting means responsive to said third detection means for resetting said loop present state register;
- means for blocking said input transfer means when said LB register is full;
- output transfer means for transferring said processor instructions at a location addressed by said PCR from said RAM to said decode logic in said processing element;
- means for blocking said output transfer means when said PCR points to an instruction that is not before the instruction pointed to by said IAR value.

* * * * *